UNITED STATES PATENT OFFICE 2,467,926

PREPARATION OF MONOMERIC ALKYL ALPHA-CYANO-ACRYLATES

Alan E. Ardis, Akron, Ohio, assignor to The B. F. Goodrich Company, New York, N. Y., a corporation of New York No Drawing. Application March 1, 1947, Serial No. 731,863

9 Claims. (Cl. 260—465.4)

This invention relates to alkyl esters of alpha-cyano acrylic acid and to a method of preparing them.

Alkyl esters of alpha-cyano acrylic acid have heretofore been obtained in the polymeric form by pyrolysis of the cyanhydrin acetates of acetyl fatty acid esters. It has now been found that alkyl esters of alphacyano acrylic acid may be obtained by reacting an alkyl cyano-acetate first with an alkali metal alcoholate and then with a compound of the general structure:

$$R\text{---}O\text{---}CH_2\text{---}X$$

in which R is an organic radical having its connecting valence on a carbon atom and containing no reactive hydrogen atoms (i. e., having all its hydrogen attached to carbon), and X is a halogen atom.

Compounds illustrative of the above general structure include the halo-methyl esters of mono-carboxylic acids (wherein R is an acyl group) such as chloro-methyl acetate, chloro-methyl propionate, bromo-methyl acetate, chloro-methyl benzoate, chloro-methyl chloroacetate, and other halo-methyl esters of substituted or unsubstituted aliphatic or cyclic monocarboxylic acids; the halo-methyl ethers (wherein R is a hydrocarbon radical) such as chloro-methyl ether, chloro-methyl ethyl ether, chloro-methyl propyl ether, chloro-methyl triphenylmethyl ether and others, as well as any other compound of the above general structure in which R has various inert substituent groups such as halogen atoms, ether groups and hydrocarbon groups. Preferably R is an alkyl, aryl or acyl radical containing from 1 to 8 carbon atoms.

According to the present invention an alkyl cyanoacetate is reacted first with an alkali metal alcoholate and then with a compound of the above structure, the reaction proceeding as indicated in the following equations:

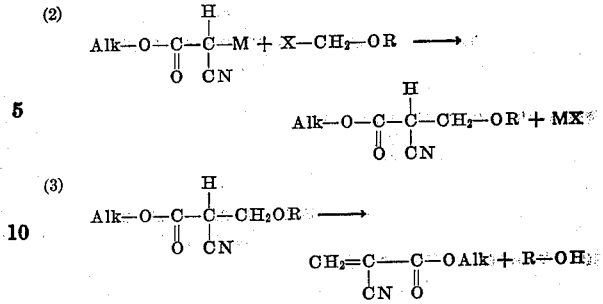

wherein Alk represents an alkyl group, M represents an alkali metal, and X and R have the same meanings as set forth above.

The reaction of the sodium alcoholate and the alkyl cyanoacetate according to Equation 1 above, is carried out at elevated temperatures of the order of 75 to 95° C. The sodium derivative of the alkyl cyanoacetate is obtained as a solution in the alcohol. When the reaction mixture is cooled the sodium derivative separates out and is obtained in the form of a thick mush. The reaction mixture may be used in the subsequent reactions as obtained or the sodium derivative may be filtered off and added to the subsequent reactions as a dry powder. The alkali alcoholate used in this reaction is preferably derived from an alcohol corresponding to the alkyl group on the cyanoacetate. For example, in the preparation of the sodium derivative of methyl cyanoacetate it is preferred to use sodium methoxide as the alcoholate. However, other alkali-metal alcoholates may be used such as sodium and potassium ethoxides, sodium butoxides, and others.

The alkyl cyanoacetate used in reaction (1) above determines the particular alpha-cyano acrylate to be obtained, for the alkyl group on the cyanoacetate molecule is not altered in the subsequent reactions. The alkyl group on the cyanoacetate may be a straight carbon chain such as the methyl, ethyl, n-propyl, n-butyl, n-amyl and others or it may be a branched carbon chain such as the isopropyl group, the isobutyl group, isopentyl group, isohexyl group and others.

The reaction of Equation 2 above, is carried out by adding the sodium derivative of the alkyl cyanoacetate to the R—O—CH₂—X compound with the formation of an addition product and a molecule of alkali halide. When the

R—O—CH$_2$—X compound is a halo-methyl ether it will be found more convenient to add the ether in a dropwise fashion to the sodium derivative of the cyanoacetate. It is preferred that a small amount of an inert solvent such as an absolute alcohol be present in order to obtain faster solution of the mushy alkyl cyanoacetate derivative. The use of an absolute alcohol corresponding to the sodium alcoholate and to the alkyl group on the cyanoacetate is to be preferred because it insures purity of product and simplifies the later steps of separating the alpha-cyano acrylate from the reaction products.

The reaction of Equation 2 is preferably conducted with vigorous stirring at temperature not higher than 50° C., preferably 35° C. or lower. Accordingly, the reaction is preferably conducted on an ice-bath or a similar low-temperature cooling device in order to adequately control the temperature of reaction.

Reaction (3) above, in all probability begins to occur as soon as any of the addition product of reaction (2) is formed. The decomposition of the addition product readily occurs upon the addition of water at room temperature with the formation of the alpha-cyano acrylate and a molecule of acid or alcohol depending on the constitution of the (R—O—CH$_2$—X) compound. However, it is desirable that the more volatile solvent (alcohol) be removed before the complete decomposition of the addition product is accomplished. Removal of the solvent is most conveniently accomplished by distilling under vacuum at low temperatures. The pot temperature preferably should not be allowed to rise above 80° C., a temperature ordinarily sufficient at low pressures to efficiently remove most alcohols.

Following the removal of the more volatile solvent materials the complete decomposition of the addition product of reaction (2) is accomplished by the addition of cold water to the reaction mixture. The addition of the cold water accomplishes separation of the ester by dissolving the alkali halide and forming a distinct oily layer containing the ester. It is not necessary that the reaction mixture be cooled following the vacuum distillation of the alcohol but the reaction mixture may be quenched by pouring directly into several volumes of cold water.

The products of the decomposition reaction of Equation 3 above will vary according to the (R—O—CH$_2$—X) compound used in reaction (2). For example, when a halo-methyl ester of a monocarboxylic acid is one of the reactants, a molecule of the carboxylic acid will be formed during the decomposition reaction of Equation 3 with the formation of a molecule of an alkali halide. When a halo-methyl ether is one of the reactants, a molecule of alcohol and a molecule of alkali halide will be formed during the reaction of Equation 3. Thus, the reaction results in a mixture of a crude ester of alpha-cyano acrylic acid, a molecule of acid or alcohol and a molecule of alkali halide.

Separation of the crude ester from the other reaction products may be accomplished by extracting the oily layer with a solvent for the ester. In the preparation of the methyl and ethyl alpha-cyano acrylic acid esters, the quenched mixture does not readily separate into layers making it necessary to extract the entire mixture with a solvent substantially immiscible with water but which will extract the acrylic acid. In the case of the butyl or higher esters, the oily layer separates from the water layer rather easily and need only be dried before distillation.

The separation and purification of the alkyl esters of the alpha-cyano acrylic acid is performed by vacuum distillation, the distillation preferably being accomplished under high vacuum of the order of one to ten millimeters of mercury or less. In this manner the decomposition of the monomer may be reduced and excellent yields of the monomeric alkyl esters of alpha-cyano acrylic acid obtained in an exceedingly high state of purity and clarity. Accordingly, the extract is first dried over a chemical drying agent such as sodium sulfate and the solvent is stripped off under vacuum. Since the crude alpha-cyano acrylate is obtained in the reaction mixture in a partially polymerized form, the distillation consists in a depolymerization and distillation of the resultant monomeric vapors. The condensate is collected in a receiver cooled to —30° C. or less in order to inhibit autopolymerization of this distillate. A preferred method is to collect the distillate in a receiver cooled by a liquid nitrogen bath or in a receiver containing a small proportion of an inhibiting substance such as picric acid.

The alkyl esters of alpha-cyano acrylic acid polymerize very readily, in fact, the lower members of the series such as the methyl and ethyl esters polymerize spontaneously. Methyl alpha-cyano acrylate undergoes autopolymerization in the vapor state so that special precautions are necessary in order to inhibit such autopolymerization and to obtain the ester in the monomeric form. It has been found that certain gaseous substances are excellent inhibitors for the polymerization so that it is possible to introduce the gaseous inhibitor into the distillation vessel directly above the surface of the distilland. The preferred gaseous inhibitor, nitric oxide (NO), inhibits autopolymerization of the alpha-cyano acrylates in the vapor phase and, furthermore, is sufficiently soluble in the liquid alpha-cyano acrylates that the condensed distillate contains sufficient nitric oxide that it will not polymerize at room temperature.

The monomeric alkyl esters of alpha-cyano acrylic acid as obtained by the method of this invention are extremely useful for the production of hard, clear glass-like resins. The polymerized alkyl esters of alpha-cyano acrylic acid are outstanding in their exceedingly high softening point (125° C. or above). Since these esters polymerize so readily, it is necessary only to warm the monomer to a temperature slightly above room temperature (50 to 100° C.) to accomplish polymerization. If the distillation is conducted in the presence of nitric oxide, the monomer containing dissolved nitric oxide need only be warmed to a temperature slightly above 50° C. in order to accomplish a smooth polymerization. The conventional per-oxygen type compounds have been found to be unnecessary for the polymerization of the alpha-cyano acrylates.

The polymeric alkyl esters of alpha-cyano acrylic acid may also be purified by recrystallizing from a solution in a solvent. For example, polymeric isobutyl alpha-cyano acrylate may be purified by precipitating the polymer from an ether solution with hexane.

Example I

Metallic sodium, 22.5 grams, was dissolved in 280 ml. of absolute ethanol [dried over Mg(OEt)₂]. 113 grams of ethyl cyanoacetate were then added to the semi-solid sodium ethoxide and the mixture was heated on a steam bath for an hour and a half. The reaction mixture was then cooled in an ice-salt bath. 180 grams of chloro-methyl acetate were placed in a reaction flask and 30 ml. of absolute ethanol were added and the flask was cooled in an ice-salt bath. The entire sodium alcoholate ethyl cyanoacetate reaction mixture (a thick mush) was poured into the chloro-methyl acetate with stirring. The temperature rose as high as 35° C. The ethanol was then distilled off under vacuum, keeping the pot temperature below 80° C.

700 ml. of cold water were then added to the residue remaining after distillation and the mixture agitated until two separate and distinct layers formed. The water layer and the oily layer were extracted three times with ether which wholly dissolved the oily layer. The ether solution was then dried over sodium sulfate, filtered, and the ether distilled off under vacuum. The ether extract was then distilled under vacuum and a main fraction distilling over at 150 to 170° C. was collected in a receiver immersed in liquid nitrogen. The boiling point range of 150 to 170° C. is not a true boiling point because a higher temperature is necessary to depolymerize the ester. The resulting monomeric ethyl alpha-cyano acrylate polymerized easily when warmed to 50° C. or higher.

The monomeric ethyl alpha-cyano acrylate prepared in Example I had a freezing point of −20 to −25° C. and upon analysis was found to contain 11.21% nitrogen, 57.40% carbon, and 5.64% hydrogen (theoretical for ethyl alpha-cyano acrylate is 11.20% nitrogen, 57.59% carbon and 5.64% hydrogen). The hard polymer prepared from the monomer had a softening point of 110° C., a melting point of 150 to 160° C. and was soluble in acetone but insoluble in alcohol and ether.

It was found that a considerable portion of the distillate in the distillation of Example I stuck to the walls of the distilling side arm and in the adapter and it was found that this material had polymerized. It was further found that if a stream of nitric oxide gas was introduced to the distillation flask just above the surface of the distilland the polymerization of the distillate in the side arm and receiver was eliminated and the ester obtained in the monomeric form.

Example II

Methyl alpha-cyano acrylate was prepared by a procedure similar to that of Example I using 23 grams of metallic sodium and 500 ml. of absolute methanol in the preparation of the sodium alcoholate. 100 grams of methyl cyanoacetate were then added to the sodium-methanol reaction mixture and the resulting mixture was heated on a steam bath for an hour and a half. The entire mixture of sodium derivative of methyl cyanoacetate in alcohol was then added to a flask containing 114 grams of chloro-methyl acetate. The temperature of the reaction mixture was maintained below 35° C. by means of an ice-salt bath. The resultant reaction mixture was poured into 700 ml. of cold water and stirred. The water and oil layers were extracted with acetone. Upon standing, a water layer separated from the acetone solution and was discarded. The acetone solution was then dried and the acetone evaporated under vacuum.

The acetone extract was distilled under vacuum in the presence of nitric oxide gas and the distillate was collected in a receiver immersed in a liquid nitrogen bath. The main fraction distilling over at 150° C. and 1 m.m. Hg pressure (not a true boiling point due to the higher temperature necessary for depolymerization) was collected. The structure of the monomeric methyl-alpha-cyano-acrylate and its existence in the monomeric form was confirmed by the Diels-Alder reaction as follows:

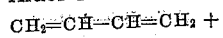

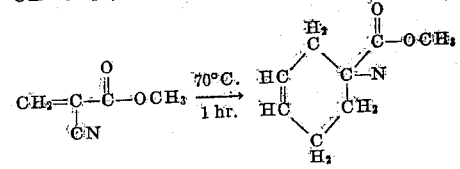

The nitrogen content of the reaction product was found to be 8.16% (theoretical 8.48%).

Methyl-alpha-cyano acrylate prepared in Example II polymerizes when the frozen monomer is melted. The resulting polymerizate was an exceedingly hard, clear, glass-like solid having a softening point of 165° C., a melting point of 200 to 205° C. It was soluble in acetone and nitroethane but was insoluble in alcohol and ether (recrystallized once-polymerized monomer is also insoluble in acetone).

Example III 200 grams of isobutyl alcohol and 8.1 grams of metallic sodium were reacted as in the previous examples and 50 grams of isobutyl cyanoacetate added to form the sodium derivative of the cyanoacetate. The resultant mixture was added to 43½ grams of chloro-methyl acetate in a flask and the temperature of reaction controlled at 35° C. The resulting reaction mixture was added to 700 ml. of cold water.

The upper or alcohol layer was separated and dried over sodium sulfate. The isobutyl alcohol was then removed by vacuum distillation. The residue was then subjected to vacuum distillation. The main fraction distilling over at 170° C. and 2 mm. Hg pressure was collected in a receiver containing a small amount of picric acid.

The monomeric isobutyl alpha-cyano acrylate prepared above polymerized in 15 min. at 95° C. to a hard, clear, glass-like resin. It was found that the hard polymeric isobutyl-alpha-cyano acrylate softened at 105° C., melted at 130 to 135° C. and was soluble in ether, alcohol and acetone. A convenient method of further purifying the polymer consists in precipitating the polymer from an ether solution by the addition of hexane.

Example IV

The foregoing examples have presented a manner of preparing various alkyl alpha-cyano acrylates utilizing the chloro-methyl esters of monocarboxylic acids as one of the reactants. This example is concerned with a manner of utilizing the chloro-methyl ethers in the preparation of the alkyl alpha-cyano acrylates.

113 grams of ethyl cyanoacetate was added with stirring to a solution of 23 grams of metallic sodium in 300 ml. of absolute ethanol and the mixture was heated on a steam bath with reflux for one hour. The reaction mixture was cooled and the sodium derivative of the ethyl cyanoacetate filtered off.

The sodium derivative of ethyl cyanoacetate was then suspended in anhydrous toluene with stirring and 80 grams of chloro-methyl methyl ether added in a dropwise fashion. When the dropwise addition was complete, the mixture was rapidly heated to reflux. When a sample of the reaction mixture tested neutral to litmus, the reaction mixture was cooled and poured into 700 ml. of cold water. The water and oily layers were extracted with ether. The ether solution was dried over sodium sulfate and the ether evaporated off. The ethyl-alpha-cyano acrylate was obtained in the monomeric form by vacuum distillation of the ether extract according to the procedure of Example I.

While there has been disclosed with considerable detail certain preferred manners of performing the invention, it is not intended or desired to be solely limited thereto for as hitherto stated the procedure may be modified, the precise proportions of the materials utilized may be varied, and other materials having equivalent properties may be employed, if desired, without departing from the spirit and scope of the invention as defined in the appended claims.

I claim:

1. The method of producing a monomeric alkyl ester of alpha-cyano acrylic acid which comprises first reacting an alkyl cyanoacetate and an alkali metal alcoholate at a temperature of about 75 to 95° C. to form an alkali metal derivative of said cyanoacetate and an alcohol, then reacting the said alkali metal derivative with a compound of the formula R—O—CH2—X wherein R is an organic radical having its connecting valence on a carbon atom and having all its hydrogen atoms connected to carbon atoms, and X is a halogen atom, at a temperature at which the reactants are maintained in the liquid state to produce a compound of the formula:

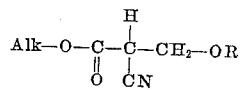

wherein Alk is an alkyl radical and R has the same meaning as above, mixing the said compound with water whereupon decomposition thereof occurs to form a reaction mixture containing a compound of the formula R—OH, wherein R has the same meaning as above and a crude partially polymerized alkyl ester of alpha-cyano acrylic acid, separating the crude partially polymerized ester from the reaction mixture, heating the said partially polymerized ester under reduced pressure to a temperature at which vapors are evolved thereby effecting depolymerization and obtaining vapors of monomeric alkyl ester of alpha-cyano acrylic acid, maintaining said vapors in contact with nitric oxide gas to prevent repolymerization and condensing the vapors to obtain the said monomeric ester stabilized against polymerization by the presence of nitric oxide.

2. The method of claim 1 wherein the compound of the formula R—O—CH2—X is chloromethyl acetate.

3. The method of claim 2 further characterized in that the alkyl cyanoacetate is methyl cyanoacetate, the monomeric ester of alpha-cyano acrylic acid obtained being methyl alpha-cyano acrylate.

4. The method of claim 2 further characterized in that the alkyl cyanoacetate is ethyl cyanoacetate, the monomeric ester of alpha-cyano acrylic acid obtained being ethyl alpha-cyano acrylate.

5. The method of claim 2 further characterized in that the alkyl cyanoacetate is butyl cyanoacetate, the monomeric ester of alpha-cyano acrylic acid obtained being butyl alpha-cyano acrylate.

6. A monomeric alkyl ester of alpha-cyano acrylic acid containing nitric oxide as a stabilizer against polymerization.

7. Monomeric methyl alpha-cyano acrylate containing nitric oxide as a stabilizer against polymerization.

8. Monomeric ethyl alpha-cyano acrylate containing nitric oxide as a stabilizer against polymerization.

9. Monomeric butyl alpha-cyano acrylate containing nitric oxide as a stabilizer against polymerization.

ALAN E. ARDIS.

REFERENCES CITED

The following references are of record in the file of this patent:

UNITED STATES PATENTS

| Number | Name | Date |
|---|---|---|
| 2,119,526 | Cope et al. | June 7, 1938 |
| 2,224,022 | Kurtz | Dec. 30, 1940 |
| 2,293,969 | Crawford et al. | Aug. 25, 1942 |
| 2,342,385 | Wallingford et al. | Feb. 22, 1944 |
| 2,391,251 | Long | Dec. 18, 1945 |